Jan. 20, 1959   G. H. ABERNATHY ET AL   2,869,284
PAPER DEPOSITING DEVICE FOR VINEYARDS, ORCHARDS, AND THE LIKE
Filed Aug. 23, 1957   3 Sheets-Sheet 1
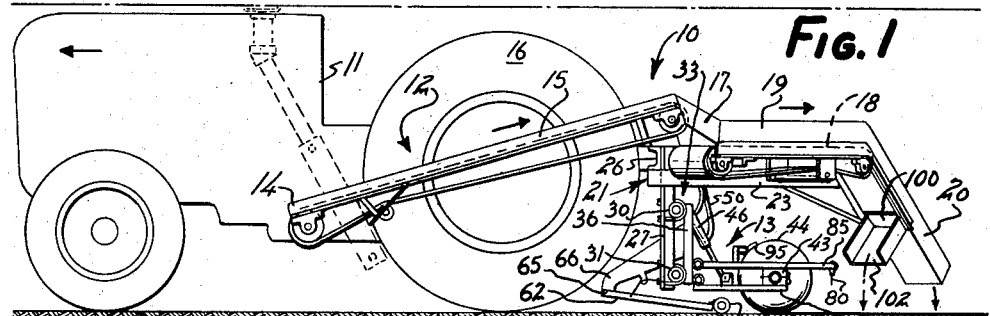
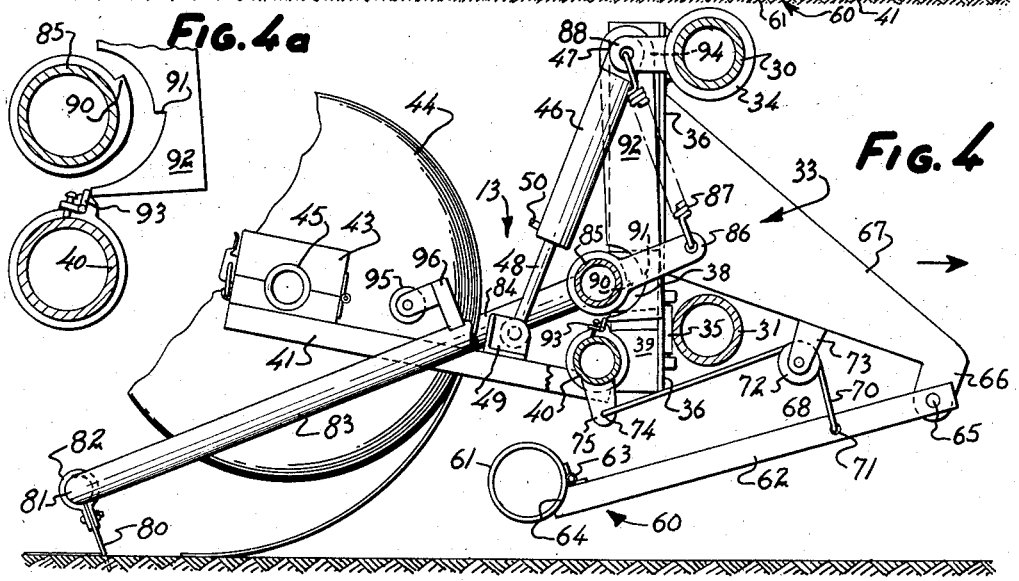
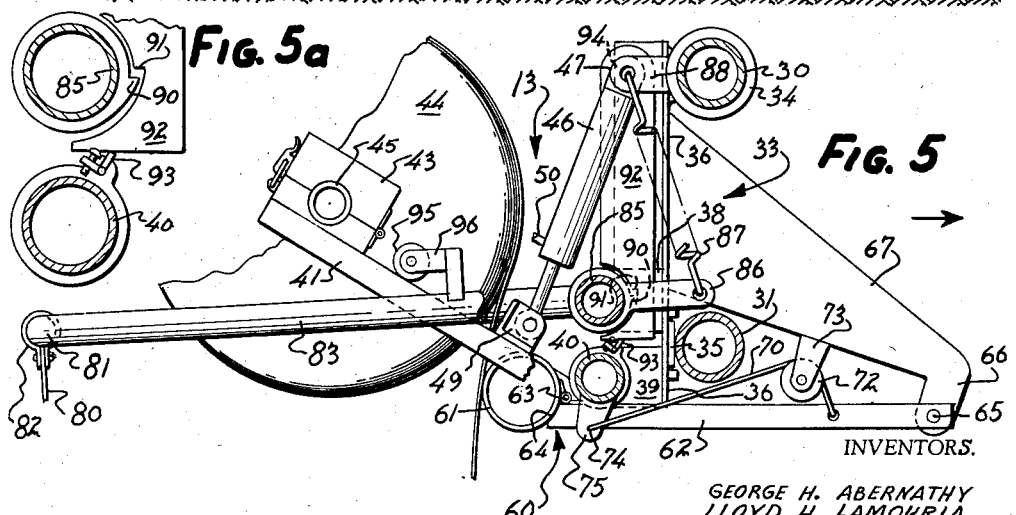
INVENTORS.
GEORGE H. ABERNATHY
LLOYD H. LAMOURIA
BY
ATTORNEY

INVENTOR.
GEORGE H. ABERNATHY
LLOYD H. LAMOURIA
BY
ATTORNEY

Jan. 20, 1959 G. H. ABERNATHY ET AL 2,869,284
PAPER DEPOSITING DEVICE FOR VINEYARDS, ORCHARDS, AND THE LIKE
Filed Aug. 23, 1957 3 Sheets-Sheet 3
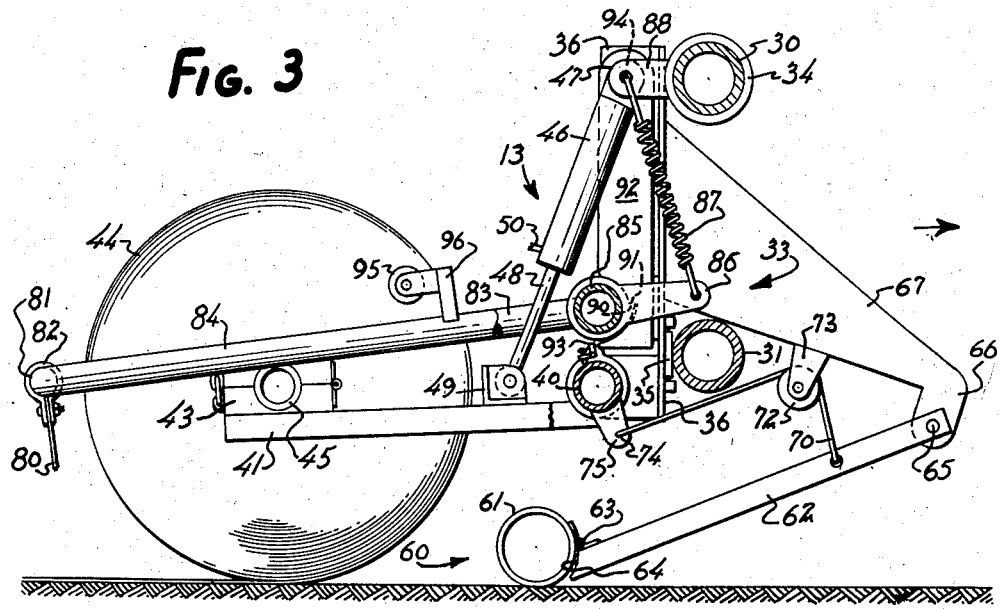
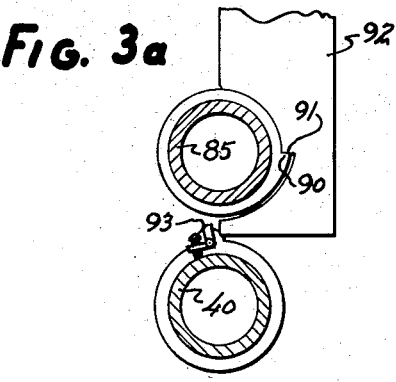
INVENTORS.
GEORGE H. ABERNATHY
LLOYD H. LAMOURIA
BY
ATTORNEY

United States Patent Office 2,869,284
Patented Jan. 20, 1959

2,869,284

PAPER DEPOSITING DEVICE FOR VINEYARDS, ORCHARDS AND THE LIKE

George H. Abernathy and Lloyd H. Lamouria, Davis, Calif., assignors to The Regents of the University of California, Berkeley, Calif.

Application August 23, 1957, Serial No. 679,943

14 Claims. (Cl. 47—9)

This invention relates to a device for unrolling a paper strip, depositing it on the ground, and cutting off a desired length thereof. It also relates to a device for simultaneously depositing fruit or the like on the deposited paper.

The invention is particularly useful in conjunction with a grape harvesting machine such as that described in the application by Lloyd H. Lamouria, filed August 24, 1956, Serial No. 606,145, but it may also be used in pineapple growing, strawberry production, and wherever else paper is to be deposited on the ground. In a typical grape harvest, the paper is placed on the ground in the area between successive rows of vines, and then the grapes are deposited on the paper, which supports them out of contact with the ground while the are sun-dried to make raisins. Other uses for the apparatus will occur to those skilled in the art.

One object of the invention is to provide an automatic paper-lying apparatus.

Another object is to unroll a paper roll carried by a tractor or other vehicle and lay the paper on the ground as the tractor moves over the ground.

Another object of the invention is to make it possible for the same tractor both to lay the paper and to harvest the grapes and deposit them on the paper.

One problem that had to be solved in order for this invention to succeed was how to cut off the paper quickly at the end of a row of vines without having to stop the tractor that was laying the paper. No previous device of this type had been acceptable, possibly because heretofore it was necessary, after unrolling a roll of paper between two rows, to stop and cut off the paper before making a turn to enter the next parallel row. The tractor driver either had to stop, get down from the tractor, and cut off the paper himself with a knife or scissors, or else someone had to come along behind, ask the tractor driver to pause at the right place and, while he was stopped, cut the paper. Both ways were too slow to be satisfactory. The present invention solves this problem by providing a cut-off device which can be operated by the tractor driver without having to stop the tractor at all, and without anyone's having to touch the paper or cut it by hand.

Another problem was how to provide for adequate sharp cut-off of the paper, since cultivated ground usually is soft and tends to yield. This meant that if a straight knife were lowered onto the paper, it would fail to cut through it, because the paper would simply be pushed down into the ground. The present invention has solved that problem by providing a sawtooth-type of knife or serrated blade which drops like a guillotine upon the paper, piercing it with sharp points in a number of places and then widening out the cut from each of those points. The cutting is so sharp that the inertia of weighted paper behind the tractor tears the paper off, even when it is not cut entirely through.

Another problem that had to be solved was how to raise the paper roll up off the ground while the tractor was making the turn around between rows, and to synchronize this raising in proper relation to the cutting operation. The invention has also solved this problem, in a manner which will be explained in detail below.

Another problem which this invention solves is that of insuring that the ground on which the paper is laid will be smooth. Ground naturally tends to be rough and have pockets, and the wheels of the tractor often make additional depressions so close to the paper that ordinarily it would not lie level. Yet, if the paper does not lie level, there is danger that rain will collect in the resultant pockets instead of draining off, and if any fruit sits in the puddles of water formed thereby, it will rot. An object, therefore, of this invention is to provide means for smoothing the ground just in front of the deposition of the paper.

The invention also includes means for raising the ground-smoothing roller at the time that the paper-laying roll is raised.

Another feature of the invention is that the paper roll can be shifted from one side of the vehicle frame to the other. A problem in this connection, when the paper layer is associated with a harvester, is caused by the necessity of changing the outlet end of the conveyor system which lays the harvested grapes on the paper to make sure that the conveyor will properly deposit the grapes upon the paper; and this problem the invention also solves, by a novel structure of the conveyor slide.

Other objects and advantages of the invention will appear from the following description of a preferred embodiment thereof.

In the drawings:

Fig. 1 is a view in side elevation of a grape harvester or the like including a tractor, a paper-laying device embodying the principles of this invention, and a conveyor system for conveying harvested grapes toward the rear of a tractor and for depositing them onto the paper laid behind the tractor. The outlet end of the conveyor is shown arranged to deposit the grapes on the side nearer the viewer. The tractor is shown in simplified form and much of the harvesting apparatus has been omitted for the sake of clarity.

Fig. 2 is a perspective view of an enlarged scale, as compared with Fig. 1, looking from behind the machine at the rear thereof and showing the paper-cutting device and a rear portion of the conveying system. The apparatus is shown in actual paper-laying position. Broken lines show the position the paper roll may take when moved to the opposite end of its carriage and an alternate position of a portion of the conveyor chute when used to deposit the grapes on the paper at the opposite side of the device, used when the paper roll is in its broken-line position. Some conduits and other parts are broken off to show the parts that would otherwise be obscured.

Fig. 3 is an enlarged view in side elevation and partly in section of the paper-laying and cut-off device in the paper-laying position, the same position as shown in Fig. 2.

Fig. 3a is a further enlarged sectional fragmentary view showing the release pawl, paper cut-off lug, and paper cut-off hold bar, when the device is in the paper-laying position shown in Fig. 3.

Fig. 4 is a view similar to Fig. 3, except that a portion of the paper roll is broken off, showing the paper-laying and cut-off device in the paper cut-off position.

Fig. 4a is a view similar to Fig. 3a, showing the position of the release pawl, paper cut-off lug, and hold-bar corresponding to Fig. 4.

Fig. 5 is a view similar to Fig. 4, showing the paper-laying and cut-off device in its fully raised transport position used for turning between rows and also when moving the harvester without laying paper.

Fig. 5a is a view similar to Fig. 4a, showing the position of the pawl, lug, and hold-bar, corresponding to Fig. 5.

Figure 2:
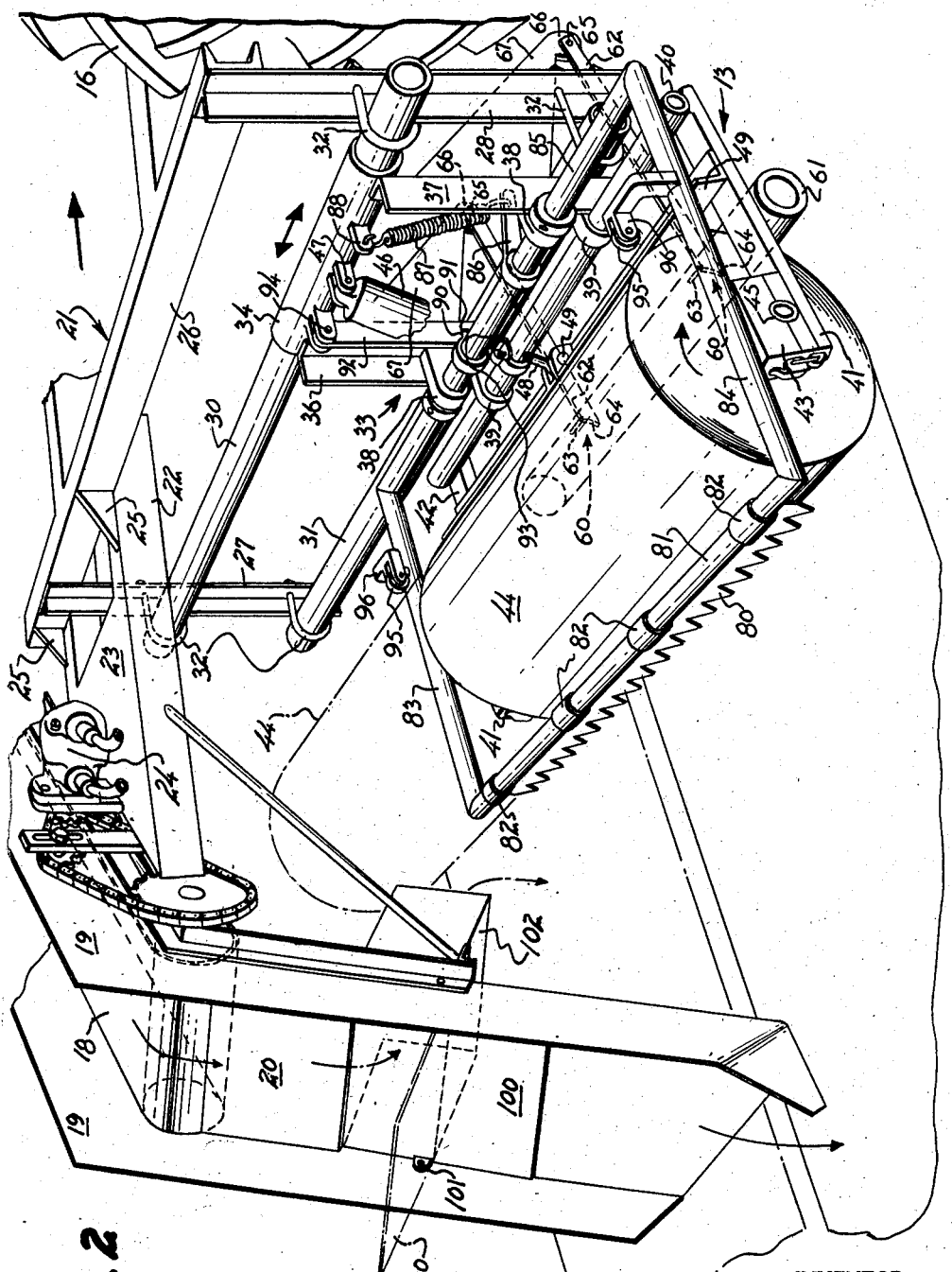

The grape harvester 10, shown (somewhat sketchily) in Fig. 1, may be substantially like that shown in full detail in the co-pending application by Lloyd H. Lamouria, Serial No. 606,145, filed August 24, 1956. The actual harvesting machinery, including the knives, etc., has been omitted from Fig. 1 because it would tend to obscure the parts with which the present invention is concerned and because the omitted parts are not essential to the practice of the present invention, since the paper-cut-off machinery and conveyor depositing apparatus may be used on other types of vehicles. Fig. 1 does show parts of the mechanical grape harvester 10 to make visualization of the invention easier and to furnish a concrete example. So far as the present invention is concerned, it will be noted that a tractor 11 carries, in addition to the harvesting cutters (which are not shown) a conveyor system 12 and a paper-laying and cut-off device 13. The harvested grapes fall (or may be placed, in a hand harvester) near the forward end 14 of a forward, longitudinally extending conveyor 15, which may be of the belt type, and which moves the grapes toward the rear and upwardly, beyond the rear wheels 16 of the tractor 11. The conveyor 15 deposits the grapes on a short slide 17, down which they slide to another conveyor 18 which extends rearwardly and somewhat transversely of the tractor 11 and may also be of the belt type. Both the conveyors 16 and 18 preferably have upstanding side walls 19 as illustrated. From the end of the conveyor 18, the grapes ordinarily fall down a chute 20 and, were it not for the paper-rolling device, would fall directly onto the ground behind the tractor 11. When grapes are being harvested for raisins, the purpose of the paper-laying device 13, as already indicated, is to keep them off the ground so they will dry properly and cleanly.

Both the conveyor system 12 and the paper-laying and cut-off device 13 may be supported by a frame 21, which may be an integral part of the tractor 11 or may be a special appliance secured rigidly to the tractor 11 for the purpose of this invention. This frame 21 may provide a broad longitudinal structural member 22 with a deck 23 supporting a motor 24 that drives the conveyor. Welded to the member 22 by means of brackets 25 is a strong transverse, horizontal frame member 26, which may be a channel iron, and welded to it are a pair of vertical girders 27 and 28, each of which may be T-beams. A pair of stationary shafts 30 and 31, each of which may be lengths of cylindrical pipe, may be secured horizontally, spaced apart vertically, from each other, across between the vertical members 27 and 28 and parallel to the frame member 26. The attachment may be by means of U-bolts 32, as shown, or by other suitable means.

An important feature of this invention is that paper can be laid from either side of the vehicle while still between the wheels 16 (or other ground-engaging means such as endless tracks). Thereby, the tractor 11 can operate in either direction between rows and still place the paper on the north side of the space between the rows of grapes (or other crops). In order to make this possible, a frame 33 supporting the entire paper-laying and cut-off device 13 is mounted slidably with respect to the two stationary shafts 30 and 31, so that the frame 33 can be moved from one side of the tractor 11 to the other. This movability may be provided by means of a cylindrical sleeve 34 comprising part of the frame 33 and mounted slidably around the upper stationary shaft 30 and also by a set of rollers 35 on the frame 33 which ride along the lower shaft 31. In other words, the shafts 30 and 31 are utilized principally as supporting ways along which the sleeve 34 and rollers 35 may slide for movement of the frame 33 from one side of the tractor 11 to the other.

Welded or otherwise firmly secured to the sleeve 34 and forming part of the frame 33 are a pair of vertically extending side-frame members 36 and 37, which may comprise angle irons. To each of these members 36 and 37 are secured a pair of journals 38 and 39. In the lower journals 39 a shaft 40, which may be made from a section of standard pipe, is mounted rotatably. This shaft 40 helps support the paper-roll by means of rigid arms 41 and 42 rigidly secured to the shaft's outer ends and extending rearwardly therefrom. At their outer ends the arms 41 and 42 may have bearing blocks 43, and the roll 44 of paper may be held on a tubular shaft 45 with spring-loaded centering cones (not shown). The shaft 45 is free to rotate in the wooden bearings 43.

Since the arms 41 and 42 which support the wooden bearings 43 are secured immovably to the rotatable pipe 40, it is evident that when the pipe 40 is rotated the paper roll 44 will be raised or lowered. This rotation may be provided by a single acting hydraulic cylinder 46, one end of which is pivotally secured to a bracket 47 on the sleeve 34, while the connecting rod 48 from its piston is pivotally secured to a rigid beam 49 which extends laterally between and is preferably welded to the two arms 41 and 42. From this it will be evident that as fluid is pumped into the cylinder 46 through the single port 50, the connecting rod 48 and the piston will be raised and therefore will swing the arms 41 and 42 up and raise the paper roll 44. When the port 50 is relieved, gravity restores the roll 44 to its lower position.

A ground-smoothing means or ground drag 60 is provided to smooth the ground in front of the paper being laid, to prevent water-collecting pockets. The ground drag 60 may comprise a length of pipe 61 slightly longer than the paper roll 44 which is both pulled and lifted by a pair of lift arms 62 to which it is attached by loose-fitting hinges 63, to accommodate lateral unevenness. The lift arms have cupped ends 64 (see Fig. 3) so that they can push the drag shaft 61 out beyond the paper-roll supporting shaft 40 to gain the needed ground clearance (see Fig. 5). The forward end of each arm 62 is pivoted at 65 to a bracket 66 on a frame member 67, which may be secured to each frame member 36 and 37 or otherwise carried as a part of the frame 33. It will be noted that a cable 70 is shown fixed at one end 71 to the arm 62 and passes over a pulley 72 (supported by a bracket 73 from the frame member 67) while its other end 74 is shown secured to a bracket 75 that depends from the shaft 40. This cable 70 insures that the drag bar 61 will be raised and lowered in conformance with the position of the paper-roll 44 and automatically and simultaneously therewith.

The paper cut-off means comprises a downwardly pointed serrated knife or blade 80 (see Fig. 1) mounted rigidly on a lateral support member 81, as by collars 82. Longitudinally-extending arms 83 and 84 are secured to the opposite ends of the member 81 and rigidly connect it to a second rotatable shaft 85, which is mounted in the journals 38. A bracket or crank 86 secured rigidly to the shaft 85 extends forwardly therefrom, and a stout spring 87 is anchored under tension between the crank 86 and a bracket or crank 88 secured rigidly to the sleeve 34. The paper is cut by the serrated knife 80 after the paper roll 44 has been partially raised; i. e., to the Fig. 4 position. The knife 80 itself is driven downward smartly by the spring 87 and uses the ground as its sole backup means.

The paper cut-off is timed in relation to the paper roll lifting operation. For this purpose a lug or pawl 90 on the paper cut-off shaft 85 is adapted to engage a step or latch 91 on a hold-bar 92 and normally hold the paper cut-off knife 80 in its raised position with the spring 87 under tension (Fig. 3). As the paper roll 44 is lifted, its shaft 40 rotates a cam or release-pawl 93 which engages the hold bar 92 and swings the hold bar 92 forward around its sleeve-supported pivot 94, (to the right as shown in Figs. 3a, 4a, and 5a). When the hold bar 92 has moved to the position shown in Figs. 4 and 4a, the lug 90 is disengaged from the step 91, and the spring 87 sends the cutting knife 80 down with great force to engage the paper at each one of its knife points and cut off the paper sharply. If not quite all the paper is cut off by the knife 80, the remainder will be severed by the forward motion of the tractor 11.

As the paper roll completes its upward travel, lift-rollers 95 carried on brackets 96 secured to the arms 83 and 84 engage the paper-roll arms 41 and 42 and lift the paper cut-off knife 80 and lug 90 to the cocked position shown in Fig. 4. Also, the release pawl 93 passes the hold bar 92, allowing the hold bar 92 to return to its normal vertical position, as shown in Fig. 4. Then, when the paper roll 44 is again lowered, the paper cut-off blade 80 is retained in its raised position by engagement of the lug 90 with the step 91 on the hold bar 92, while the release pawl 93, being hinged to rotate freely clockwise (but supported against rotation by counterclockwise movement), can pass beneath the hold bar 92 without disturbing it and reset itself automatically to the position shown in Fig. 3a, ready for another cycle.

Since the frame 33 which supports the entire apparatus 13 for leveling the ground, cutting off the paper, and holding the paper roll, is mounted slidably with respect to the stationary shafts 30, 31, it may be positioned on the right-hand side of the tractor 11, (as shown in solid lines in Fig. 2), with the paper roll 44 located just to the left of the path made by the wheel 16, or it may be slid to the left-hand side of the tractor 11, as shown in broken lines in Fig. 2. When the frame 33 is in the position shown in solid lines, the chute 20 is also in the position shown in solid lines. That means that the grapes which come from the conveyor 18 will slide down the chute 20 and be deposited approximately in the center of the paper strip, behind the tractor 11. When, on the other hand, the frame 33 and all its parts are slid over to the broken-line position, the conveyor chute 20 has to be changed. For this purpose, a portion 100 of the chute 20 is pivotally mounted at 101 so that the portion 100 can be swung over a 90° stroke and may be locked in either position. Then what was formerly part of the bottom or floor of the chute portion 100 becomes a deflector for a short counter-chute 102 on which the grapes or other fruit may slide onto the paper. Thus the same conveyor system 15 can be used for either side of the tractor by simply swinging the chute portion 100 to either of its two extreme positions, to carry the grapes on down the chute 20 or to carry them down the counter-chute 102.

The operation of the device has been described in detail while describing the apparatus, because the structure of the device can best be understood in connection with its operation; but the operation will be briefly reviewed now, with particular reference to Figs. 3, 4 and 5.

As the tractor 11 is to move along the field in a straight line, harvesting grapes if desired, and having the grapes deposited on the conveyor system 15 for later dropping from the chute 20 or counter-chute 102, the paper mounting and cut-off apparatus 13 is first properly positioned. That is, the frame 33 is preferably moved to one side or the other of the tractor 11 for, although it may be moved to an intermediate position if that is desired, it usually will not be. The paper roll 44 is lowered to the position shown in Fig. 3, by the tractor operator operating a lever which relieves the port 50 in the cylinder 46. The knife 80 has previously been cocked, and the ground smoother 61 is lowered to position simultaneously with the paper roll 44 by the fact that the cable 70 is connected to the crank or bracket 75.

The tractor driver then simply drives along, and the paper will automatically come off the roll 44, due to its contact with the ground. In some instances it may be found helpful to place a weight such as a bunch of grapes or a rock on the paper behind the tractor, to hold the paper, especially if the wind is blowing, but this is not normally required. At any rate, as the tractor 11 continues moving, the roll 44 continues to unroll freely, leaving the paper stationary on the ground in a strip behind the tractor. The grapes that are put on the conveyor 15 are automatically carried to the chute 20 and deposited on the strip of paper, if that is what is desired.

When the tractor driver comes to the end of a row, he operates the lever (not shown) for the hydraulic cylinder 46, sending fluid into the port 50 and raising the arm 48. The result of that raising is to rotate the shaft 40 and raise the roll 44 of paper. When the shaft 40 has been rotated a given amount, the release pawl 93 deflects the hold bar 92 forward and unlocks the lug or pawl 90 from the step or catch 91. As soon as this is done, the spring 87 brings the knife 80 down against the paper with great force and cuts off the paper as shown in Fig. 4. Meanwhile, the ground-smoothing roll 61 has been raised a short distance by virtue of the rotation of the crank 75 raising the cable 70.

As the cylinder piston continues to move upwardly, under the pressure of the fluid, the shaft 40 is rotated further to a place permitting the hold bar 92 to drop back to a free-hanging vertical position, preparatory to latching, while the arms 41, 42 raise the paper roll 44 to the fully retracted position. The ground engaging and smoothing member 61 is simultaneously raised by its cable 70 to its fully retracted position, shown in Fig. 5. In the meantime, the rollers 95 ride up the arms 41, 42 to raise the knife 80 above the ground.

When the turn has been completed, the operator moves his lever for the hydraulic system to relieve the port 50 and then the cylinder 46 drops to its Fig. 3 position. As it does so, the latch 90 engages the catch 91, locking the knife 80 in its raised position, while the shaft 40 turns, carrying the roll 44 down to its ground-engaging position and carrying the ground-smoothing roll 61 down to its ground-engaging position, by virtue of the cable 70. This goes on, with the raising being repeated again at the end of the row. For the transport position, the roll 44 is again raised, as before; and every time it is raised, of course, the paper is severed, so there is nothing dragging behind the tractor.

It will thus be evident that the device can be operated by the tractor driver alone, at a slow driving speed sufficient for harvesting, and that the cut-off and lifting can be made practically automatic, all that he has to do being to move one lever. He does not have to stop the tractor during the cutting—in fact, the movement of the tractor 11, itself, aids in the cutting operation in case the knife 80 does not completely sever all the paper. The sharp movement of the knife 80 downward, together with its serrated edge, usually suffices to sever the paper, however.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A device for laying a strip of paper on the ground, comprising a vehicle having a frame; paper-roll supporting means carried by said frame with the axis of the roll perpendicular to the direction of travel of the vehicle, said supporting means holding said roll for free rotation; a serrated blade supported movably by said frame; and means for impelling said blade down to the ground for shearing from said roll the paper laid therefrom at any desired time while said vehicle is moving, whereby the paper is pierced at a number of parts by the serrated blade and each piece is widened, so as to sever the paper even when the paper is being laid over soft yieldable soil.

2. An agricultural paper-laying device, comprising a vehicle having a frame; paper-roll supporting means carried by said frame with the axis of the roll perpendicular to the direction of travel of the vehicle, said supporting means holding said roll for free rotation; ground-smoothing means supported by said frame forward of said supporting means for smoothing the ground over which the paper is to be laid; and means supported by said frame for shearing from said roll the paper laid therefrom at any desired time while said vehicle is moving.

3. An agricultural paper-laying and cut-off device, comprising a vehicle having a frame; a paper-roll supporting means supported movably with respect to said frame with the axis of the roll perpendicular to the direction of travel of the vehicle, said supporting means holding said roll for free rotation; ground-smoothing means supported movably with respect to said frame forward of said paper-roll supporting means; knife means supported movably with respect to said frame and actuatable for shearing from said roll the paper laid therefrom at any desired time while said vehicle is moving; and means for sequentially and automatically raising said paper-roll supporting means and said ground-smoothing means, impelling said knife against said paper, and raising said knife.

4. A paper-laying and cut-off device, comprising a vehicle having a frame; a roll-supporting structure secured rotatably to said frame for supporting a paper roll for free relative rotation; means for rotating said structure so as to raise and lower said paper roll; a knife frame rotatably mounted to said frame adjacent said structure; a serrated knife blade supported vertically downwards at the outboard end of said knife frame; means normally urging said knife frame to rotate in a direction tending to force said knife blade down; latch means normally locking said knife frame in a knife-up position; means for releasing said latch means after said roll has been partially raised so that said knife drops and severs the paper; and means for lifting said knife from said dropped position into the latched position when said structure is raised.

5. The device of claim 4 having ground-smoothing means extending widthwise of said vehicle forward of said paper roll and pivotally supported by said frame; and means for lifting said ground-smoothing means when said paper roll is raised.

6. A paper-laying and cut-off device, comprising a vehicle having a frame; paper-roll-supporting means carried by said frame and rotatable along an axis widthwise of said vehicle, for supporting a paper roll for free relative rotation; means for rotating said supporting means relative to said frame; a knife frame rotatably mounted to said frame; a knife blade with a serrated edge supported vertically downwards at the outboard end of said knife frame, said knife frame being normally urged to rotate in a direction tending to force said knife blade down; a lug on said knife frame; a latch bar hanging from said frame and having a catch normally adapted to engage said lug and lock said knife frame in a knife-up position; one-direction cam means on said supporting means for releasing said lug from said catch when said paper roll is raised, so that said knife drops and severs the paper; and means supported on said knife frame for engagement with said supporting means after said knife has been dropped and said arms have been raised a predetermined distance, for lifting said knife from said dropped position into the latched position.

7. The device of claim 6 having a ground-smoothing member extending widthwise of said vehicle; frame-supported pivotally-mounted members extending longitudinally of said vehicle and loosely hinged to said ground-smoothing member for support thereof; and means secured to said last-named members and to said supporting means, for lifting said ground-smoothing member when said supporting frame is raised.

8. A paper-laying and cut-off device, comprising a vehicle having a frame; a paper-roll carrier mounted rotatably on said frame parallel to said two shafts and supporting a paper roll for free relative rotation; means serving to rotate said carrier relative to said frame for raising and lowering said paper roll; a knife-frame rotatably mounted to said frame and having a paper-cutting knife supported vertically downwards at its outboard end; means normally urging said knife frame to rotate in a direction tending to force said knife blade down; a pawl on said knife frame; a catch normally adapted to engage said pawl and lock said knife frame in a knife-up position; a cam for releasing said catch upon rotation of said third shaft, so that said knife drops and severs the paper; and means on said knife frame for engagement with said carrier after said knife has been dropped and said carrier has been raised a predetermined distance, for lifting said knife from said dropped position into the latched position.

9. A paper-laying and cut-off device, comprising a vehicle having a frame supported on movable ground-engaging means; a rotatable shaft journaled to said frame and extending widthwise of said vehicle; a roll-supporting structure secured to said rotatable shaft for supporting a paper roll for free relative rotation; hydraulic means including a cylinder and a piston with a connecting rod, one of said cylinders and rods being pivotally mounted to said frame and the other being pivotally mounted to said roll-supporting structure, said hydraulic means serving to rotate said rotatable shaft, so as a raise and lower said paper roll; a knife frame rotatably mounted to said frame; a serrated knife blade supported vertically downwards, at the outboard end of said knife frame; spring means normally urging said knife frame to rotate in a direction tending to force said knife blade down; latch means normally locking said knife frame in a knife-up position; means connected to said rotatable shaft for releasing said latch means after said roll has been partially raised so that said knife drops and severs the paper; means supported on said knife frame for engagement with said roll-supporting structure after said knife has been dropped, for lifting said knife from said dropped position into the latched position when said structure is raised; ground-smoothing means extending widthwise of said vehicle and pivotally supported by said frame; and means for lifting said ground-smoothing means when said paper roll is raised.

10. A paper-laying and cut-off device, comprising a vehicle having a frame supported on movable ground-engaging means; stationary shaft means mounted on said frame widthwise of said vehicle between the paths of said ground-engaging means; a sleeve mounted slidably on said shaft means; a rigid sub-frame depending from said sleeve, said sleeve and sub-frame being movable as a unit from one side to the other of said vehicle frame along said shaft means; a rotatable shaft journaled to said sub-frame and extending widthwise of said vehicle; a roll-supporting structure secured to said rotatable shaft for supporting a paper roll for free relative rotation; hydraulic means including a cylinder and a piston with a connecting rod, one of said cylinders and rods being pivotally mounted to said sleeve and the other being pivotally mounted to said roll-supporting structure, said hydraulic means serving to rotate said rotatable shaft so as to raise and lower said paper roll; a knife frame rotatably mounted to said sub-frame above said rotatable shaft; a serrated knife blade supported vertically downwards at the outboard end of said knife frame; spring means normally urging said knife frame to rotate in a direction tending to force said knife blade down; latch means normally locking said knife frame in a knife-up position; means connected to said rotatable shaft for releasing said latch means after said roll has been partially raised so that said knife drops and severs the paper; means supported on said knife frame for engagement with said roll-supporting structure after said knife has been dropped, for lifting said knife from said dropped position into the latched position when said structure is raised; ground-smoothing means extending widthwise of said vehicle and pivotally supported by and outboard of said sub-frame; and means for lifting said ground-smoothing means when said paper roll is raised.

11. A paper-laying and cut-off device, comprising a vehicle having a frame; two parallel stationary shafts mounted one above the other on said frame, widthwise of said vehicle; a sub-frame mounted slidably on the upper said shaft for movement from one side to the other thereof; a third shaft carried rotatably by said sub-frame parallel to said two shafts; a rigid assembly secured to said third shaft having means thereon for supporting a paper roll for free relative rotation; hydraulic means including a cylinder and a piston with a connecting rod, one of said cylinders and rods being pivotally mounted to said sub-frame and the other being pivotally mounted to said rigid assembly, said hydraulic means serving to rotate said third shaft relative to said supports, so as to swing said rigid assembly for raising and lowering said paper roll; a knife frame having a fourth shaft extending widthwise of said vehicle as a portion thereof and rotatably mounted to said sub-frame; a serrated knife blade supported vertically downwards at the outboard end of said knife frame; spring means normally urging said knife frame to rotate in a direction tending to force said knife blade down; a pawl on said knife frame; a catch normally adapted to engage said pawl and lock said knife frame in a knife-up position; a cam on said third shaft for releasing said catch upon rotation of said third shaft, so that said knife drops and severs the paper; means on said knife frame for engagement with said rigid assembly after said knife has been dropped and said rigid assembly has been raised a predetermined distance, for lifting said knife from said dropped position into the latched position; a ground-smoothing member extending widthwise of said vehicle; frame-supported pivotally-mounted members extending longitudinally of said vehicle and hinged to said ground-smoothing member for support thereof; and cable and pulley means with one end secured to said last-named members and the other end secured to a crank on said third shaft, for lifting said ground-smoothing member when said paper roll is raised.

12. A paper-laying and cut-off device, comprising a vehicle having a frame supported on movable ground-engaging means; a first shaft carried rotatably by said frame widthwise of said vehicle; a pair of rigid arms extending lengthwise of said vehicle from said first shaft, said arms having means thereon for supporting a paper roll for free relative rotation; a lateral member joining said arms outboard of said first shaft; hydraulic means including a cylinder and a piston with a connecting rod, one of said cylinders and rods being pivotally mounted to said frame and the other being pivotally mounted to said lateral member, said hydraulic means serving to rotate said first shaft relative to said supports, so as to swing said arms for raising and lowering said paper-roll; a knife frame having a second shaft extending widthwise of said vehicle as a portion thereof, said second shaft being rotatably mounted to said frame, said knife frame also having longitudinally extending members extending on each side of said paper roll adjacent said rigid arms; a serrated knife blade supported vertically downwards at the outboard end of said longitudinally extending members; spring means normally urging said knife frame to rotate in a direction tending to force said knife blade down; a pawl on said knife frame; a latch bar pivotally supported for free hanging from said frame, said bar having a catch normally adapted to engage said pawl and lock said knife frame in a knife-up position; a yieldably mounted one-direction cam on said first shaft rotated when said paper roll is raised to push said bar away from said pawl, to release said pawl so that said knife drops and severs the paper, said cam on further rotation swinging beyond said bar and permitting relatching of said pawl, said cam being mounted to yield when contacting said bar on reverse rotation; and roller means supported on said knife-frame longitudinal members for engagement with said arms after said knife has been dropped and said arms have been raised a predetermined distance, for lifting said knife from said dropped position into the latched position.

13. The device of claim 12, having a ground-smoothing member extending widthwise of said vehicle; frame-supported pivotally mounted members extending longitudinally of said vehicle and loosely hinged to said ground-smoothing member for support thereof; and cable and pulley means with one end secured to said last-named members and the other end secured to a crank on said first shaft, for lifting said ground-smoothing member when said paper roll is raised.

14. A paper-laying and cut-off device, comprising a vehicle having a frame supported on movable ground-engaging means; two parallel stationary shafts mounted one above the other on said frame widthwise of said vehicle between the paths of said ground-engaging means; a sleeve mounted slidably on the upper said shaft; rigid vertical support means secured to said sleeve and extending down therefrom; a third shaft carried rotatably by said support means adjacent the lower said stationary shaft and parallel thereto; antifriction means carried by said support means engaging said lower shaft so that said sleeve, said supports, and said third shaft can move as a unit from one side to the other of said vehicle frame along said upper and lower shafts; a pair of rigid arms extending lengthwise of said vehicle from said rotatable third shaft, said arms having means thereon for supporting a paper roll for free relative rotation; a lateral member joining said arms outboard of said third shaft; hydraulic means including a cylinder and a piston with a connecting rod, one of said cylinders and rods being pivotally mounted to said sleeve and the other being pivotally mounted to said lateral member, said hydraulic means serving to rotate said third shaft relative to said supports, so as to swing said arms for raising and lowering said paper roll; a knife frame, having a fourth shaft extending widthwise of said vehicle as a portion thereof, said fourth shaft being rotatably mounted to said support means above said third shaft, said knife frame also having longitudinally extending members extending on each side of said paper roll adjacent said rigid arms; a serrated knife blade supported vertically downwards at the outboard end of said longitudinally extending members; spring means normally urging said knife frame to rotate in a direction tending to force said knife blade down; a pawl on said knife frame; a latch bar pivotally supported for free hanging from said sleeve, said bar having a catch normally adapted to engage said pawl and lock said knife frame in a knife-up position; a yieldably mounted one-direction cam on said third shaft rotated when said paper roll is raised to push said bar away from said pawl, to release said pawl so that said knife drops and severs the paper, said cam on further rotation swinging beyond said bar and permitting relatching of said pawl, said cam being mounted to yield when contacting said bar on reverse rotation; roller means supported on said knife frame longitudinal members for engagement with said arms after said knife has been dropped and said arms have been raised a predetermined distance, for lifting said knife from said dropped position into the latched position; a ground-smoothing member extending widthwise of said vehicle; frame-supported pivotally-mounted members extending longitudinally of said vehicle and loosely hinged to said ground-smoothing member for support thereof; and cable and pulley means with one end secured to said last-named members and the other end secured to a crank on said third shaft, for lifting said ground-smoothing member when said paper roll is raised.

References Cited in the file of this patent

UNITED STATES PATENTS

| | | |
|---|---|---|
| 1,292,082 | Sanford | Jan. 21, 1919 |
| 1,471,796 | McGuire | Oct. 23, 1923 |
| 2,078,872 | Pfeiffer | Apr. 27, 1937 |

FOREIGN PATENTS

| | | |
|---|---|---|
| 826,516 | Germany | Jan. 3, 1952 |

UNITED STATES PATENT OFFICE
CERTIFICATE OF CORRECTION

Patent No. 2,869,284                      January 20, 1959

George H. Abernathy et al.

It is hereby certified that error appears in the printed specification of the above numbered patent requiring correction and that the said Letters Patent should read as corrected below.

Column 1, line 23, for "while the" read -- while they --; column 2, line 35, for "of an enlarged" read -- on an enlarged --; column 6, line 65, for "piece" read -- pierce --; column 8, lines 17, 51, column 9, lines 8 and 45, and column 10, line 28, for "cylinders and rods", each occurrence, read -- cylinder and rod --; column 8, line 20, for "a raise" read -- to raise --.

Signed and sealed this 2nd day of June 1959.

(SEAL)
Attest:

KARL H. AXLINE
Attesting Officer

ROBERT C. WATSON
Commissioner of Patents